US008490190B1

(12) United States Patent
Hernacki et al.

(10) Patent No.: US 8,490,190 B1
(45) Date of Patent: Jul. 16, 2013

(54) USE OF INTERACTIVE MESSAGING CHANNELS TO VERIFY ENDPOINTS

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1514 days.

(21) Appl. No.: 11/479,852

(22) Filed: Jun. 30, 2006

(51) Int. Cl.
| | |
|---|---|
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |
| G06F 15/16 | (2006.01) |
| G08B 23/00 | (2006.01) |
| H04N 7/16 | (2006.01) |
| H04L 29/06 | (2006.01) |

(52) U.S. Cl.
USPC ............... 726/23; 726/3; 726/28; 726/29

(58) Field of Classification Search
USPC .......... 726/1–7, 14, 21, 23–30; 713/182–185; 380/59
See application file for complete search history.

(56) References Cited

U.S. PATENT DOCUMENTS

| 6,321,338 | B1 * | 11/2001 | Porras et al. ............... 726/25 |
|---|---|---|---|
| 6,484,203 | B1 * | 11/2002 | Porras et al. ............... 709/224 |
| 6,708,212 | B2 * | 3/2004 | Porras et al. ............... 709/224 |
| 7,107,619 | B2 * | 9/2006 | Silverman ................... 726/27 |
| 7,548,956 | B1 * | 6/2009 | Aoki et al. ................... 709/207 |
| 2003/0046577 | A1 * | 3/2003 | Silverman ................... 713/200 |
| 2003/0051026 | A1 * | 3/2003 | Carter et al. ................ 709/224 |
| 2003/0217105 | A1 * | 11/2003 | Zircher et al. .............. 709/205 |
| 2004/0103318 | A1 * | 5/2004 | Miller et al. ................ 713/201 |
| 2004/0136386 | A1 * | 7/2004 | Miller et al. ................ 370/401 |
| 2004/0260947 | A1 * | 12/2004 | Brady et al. ................ 713/201 |
| 2006/0136219 | A1 * | 6/2006 | Wang .......................... 704/273 |
| 2006/0150249 | A1 * | 7/2006 | Gassen et al. ............... 726/23 |
| 2006/0168048 | A1 * | 7/2006 | Lyle et al. ................... 709/206 |
| 2006/0174028 | A1 * | 8/2006 | Zhu ............................. 709/232 |

* cited by examiner

*Primary Examiner* — Edan Orgad
*Assistant Examiner* — Jahangir Kabir
(74) *Attorney, Agent, or Firm* — Wilmer Cutler Pickering Hale and Dorr LLP (57) ABSTRACT

Monitoring activity in a network is disclosed, including monitoring a communication associated with a messaging service, observing suspicious activity associated with a host associated with the messaging service, and sending a challenge to the host using the messaging service.

19 Claims, 5 Drawing Sheets

| User name | Time | Service | Connection/ Session Info |
|---|---|---|---|
| brianj | 11:27 6/19/2006 | AIM | 10.1.12.12/80, 10.3.45.2/5190, passwd123 |
| | | | |
| | | | |
| | | | |

FIG. 4

USE OF INTERACTIVE MESSAGING CHANNELS TO VERIFY ENDPOINTS

BACKGROUND OF THE INVENTION

A network security application and/or device, such as a firewall or intrusion detection system (IDS), can be used to observe network traffic for suspicious activity, such as activity associated with a worm or a "bot". A bot is a software agent configured to cause a host to perform autonomously some task, typically without requiring action nor even knowledge or awareness of the existence of the bot on the part of a user of the host. An agent that periodically checks for updates to an application is an example of a bot. Malicious users such as hackers have configured bots to perform tasks associated with exploits such as distributed denial of service (DoS) attacks, e.g., to cause many compromised hosts to send HTTP or other traffic to a targeted host at the same time, or to propagate worms and/or other malicious code. In some cases, malicious users have configured bots to connect to a specified chat or instant messaging channel, to enable the malicious user to communicate nearly simultaneously with his/her bots, e.g., to trigger an attack, without requiring that the malicious user know which hosts have been (and/or remain) compromised and/or having to communicate individually with each such host. When a network security device observes network traffic that is suspect, it is often difficult to determine whether to block the suspicious traffic because of the risk of a false positive. For example, suppose that a host connecting to an Internet Relay Chat (IRC) server and joining a channel is observed. This could be indicative of a bot or it could be a legitimate user. In another example, a sudden spike in traffic from an endpoint that resembles a scan is observed. If it is malware scanning the network, the host should be dropped from the network. If it is just an authorized user running a diagnostic or other tool, the host should not be dropped.

Under existing approaches, typically a port or protocol associated with suspicious traffic is blocked, in some cases too often resulting in legitimate traffic being blocked, or a local endpoint agent installed on the host with which the suspicious traffic is associated is used to verify the traffic. However, it is often not possible or practical to block all access to a port or to have agents running on all hosts. Therefore, an improved method of monitoring traffic and determining whether suspicious traffic is legitimate would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Use of observed interactive messaging channel contact information to verify the security status of an endpoint, e.g., to verify that an endpoint communicating via the messaging channel from a monitored host is not a bot, is disclosed. A network security application and/or device observes network messaging service traffic (e.g. IRC or Instant Messaging (IM)) to obtain contact information for a messaging service endpoint/participant. When suspicious activity is observed, a challenge or other security communication is sent to the participant using the messaging service. In the case of a suspected bot, the challenge in some embodiments requires a response that it is considered a bot would not be likely to be able to determine and/or provide.

Figure 1:
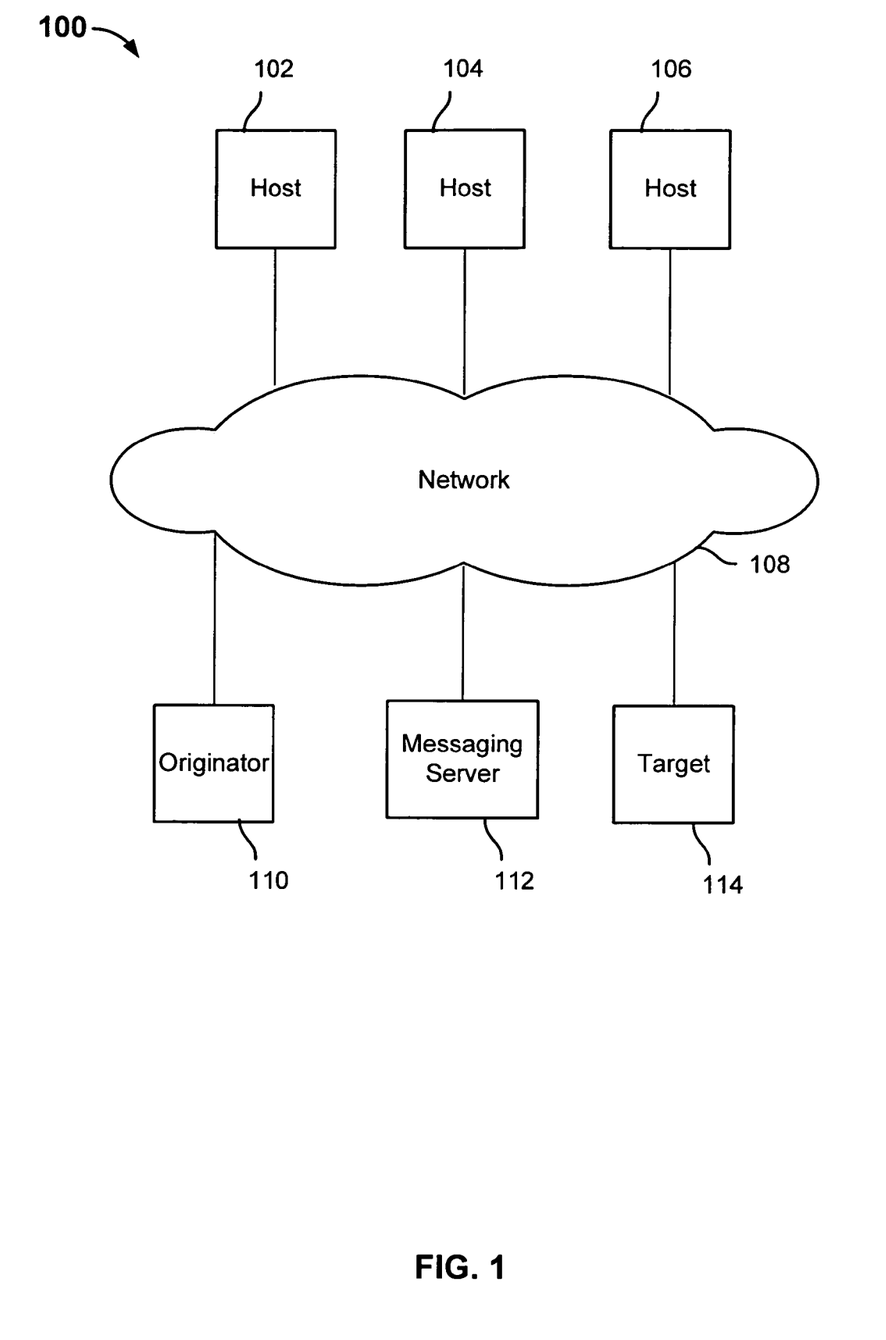
FIG. 1 is a block diagram illustrating an embodiment of a system that may be vulnerable to an attack.

FIG. 1 is a block diagram illustrating an embodiment of a system that may be vulnerable to an attack. In this example, system 100 is shown to include hosts 102-106, originator 110, messaging server 112, and target 114 connected via network 108. Network 108 may include any network (e.g., the Internet, an internal network) or a collection of networks. Each of devices 102-114 may include any device used for sending and/or receiving data, such as a personal computer (PC), laptop, client, server, terminal, mainframe, mobile telephone, personal digital assistant (PDA), etc. For example, hosts 102-106 and originator 110 may be PCs or laptops owned by individual users, while messaging server 112 and target 114 are commercial servers. Messaging server 112 runs a messaging service that may be used by devices to communicate with each other. For example, messaging server 112 may include an IRC server or IM server, such as AOL Instant Messenger (AIM) or Yahoo Instant Messenger (YIM). Target 114 is a device that may be vulnerable to attack, such as a high profile commercial server (e.g., microsoft.com, ebay.com, amazon.com, etc.) or a server containing valuable data (e.g., a Department of Defense server).

Target 114 may be vulnerable to an attack because a botnet is running on system 100. A botnet is a collection of devices each running a program (bot) under the control of an originator, e.g., using a command and control infrastructure. A bot may include any malicious software (malware), such as a virus, worm, etc. A botnet's originator can control the group remotely using a messaging system such as IRC. For example, the originator may send a message to the group via IRC that instructs the bots to attack target 114.

In system 100, each of hosts 102-106 have a bot running on them; that is, a bot was installed at some point on hosts 102-106, possibly unbeknownst to the owners/users of hosts 102-106. For example, a user may have unknowingly installed the bot when opening an email attachment or downloading a file from the Internet. The bots running on hosts 102-106 log into a messaging system running on messaging server 112. A malicious operator using originator 110 also logs into the messaging system, and can now control the bots by sending messages via the messaging system. For example, the message might be "Has anyone seen the latest Spider-Man™ movie?," which the bots may be programmed to interpret as "Go attack target 114." The bots may then begin sending packets to target 114, flooding target 114 to effect a (distributed) Denial of Service (DoS) attack.

The messaging system may provide one to one communication, one to many communication, many to one communication, or many to many communication. In some embodiments, a group service that allows one to many communication is used by an originator to control a network of bots. Examples of a group service include an IRC channel or an IM group chat or chat room. Each bot and the originator connect to the group service and the originator communicates to the entire group of bots via the group service.

As used herein, a participant refers to a participant in a messaging service communication and a user refers to a user of a host. For example, a user may login to an AIM account with a particular username as a participant of the messaging service. In some embodiments, each participant is associated with a messaging service username and/or account.

Figure 2:
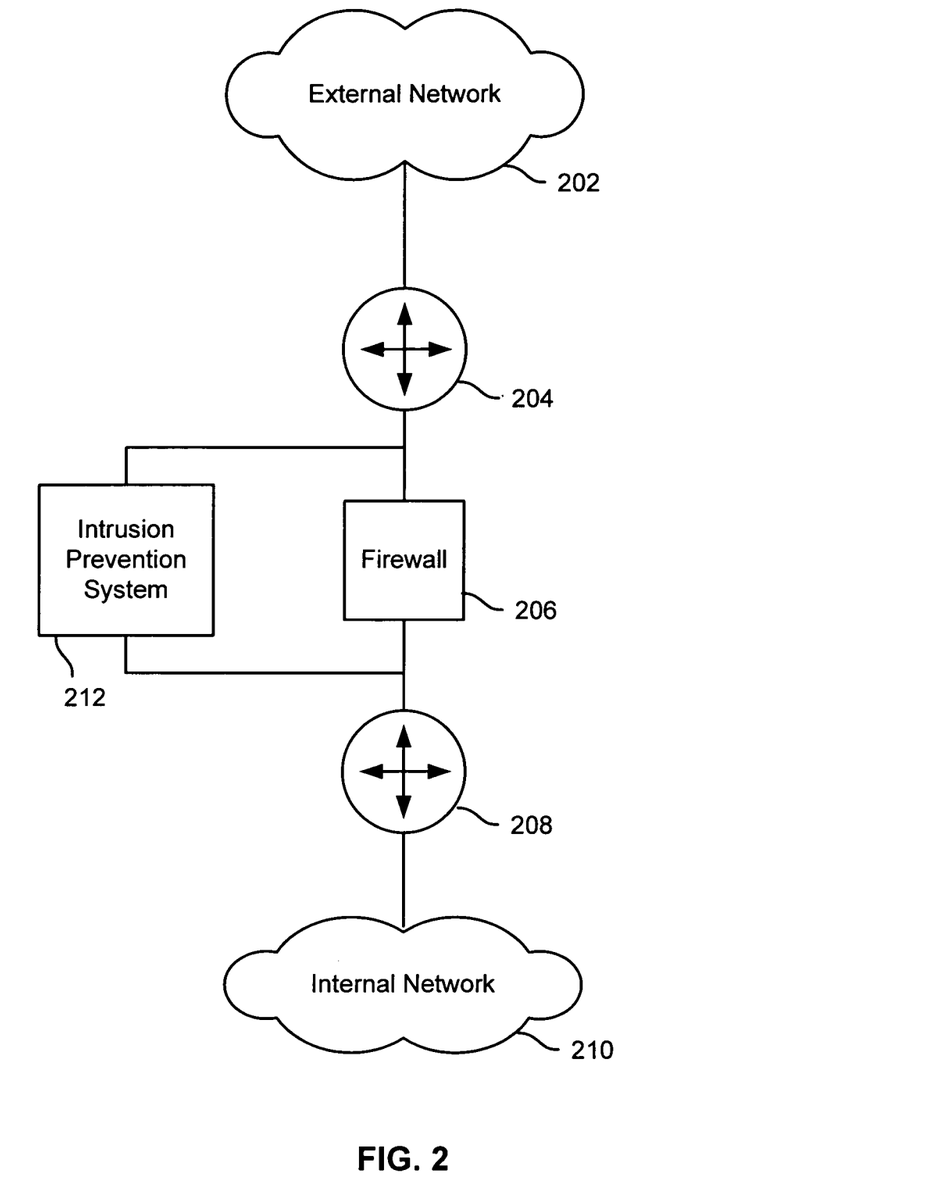
FIG. 2 is a block diagram illustrating an embodiment of a system for monitoring network activity.

FIG. 2 is a block diagram illustrating an embodiment of a system for monitoring network activity. In this example, devices in external network 202 (e.g., the Internet) communicate with devices in internal network 210 (e.g., a plurality of hosts running within a company intranet). Traffic between external network 202 and internal network 210 travels across router (or other connector) 204, firewall 206, and router (or other connector) 208. Router 204 may be operated by an Internet Service Provider (ISP). Intrusion Prevention System (IPS) 212, firewall 206, or any other network security system and/or application monitor network activity between internal network 210 and external network 202. Examples of network security systems and/or applications include: Symantec Network Security (SNS), Symantec Gateway Security (SGS), Symantec IM Manager, and Symantec Client Security (SCS). The security system may reside on any device in the network, including a host or network edge (e.g., on an operating system in a virtual machine running on the host). The security system may be managed by an enterprise or a service provider.

One or more hosts in internal network 210 may be running a bot or other malicious program. Such bots may login to a messaging server located in external network 202. A malicious originator may also log into the messaging server and use the messaging service to send command and/or control messages to the bots in internal network 210. Because firewall 206 and IPS 212 can view all messages between internal network 210 and external network 202, firewall 206 and IPS 212 can potentially identify suspicious activity between a host in internal network 210 and external network 202.

Figure 3A:
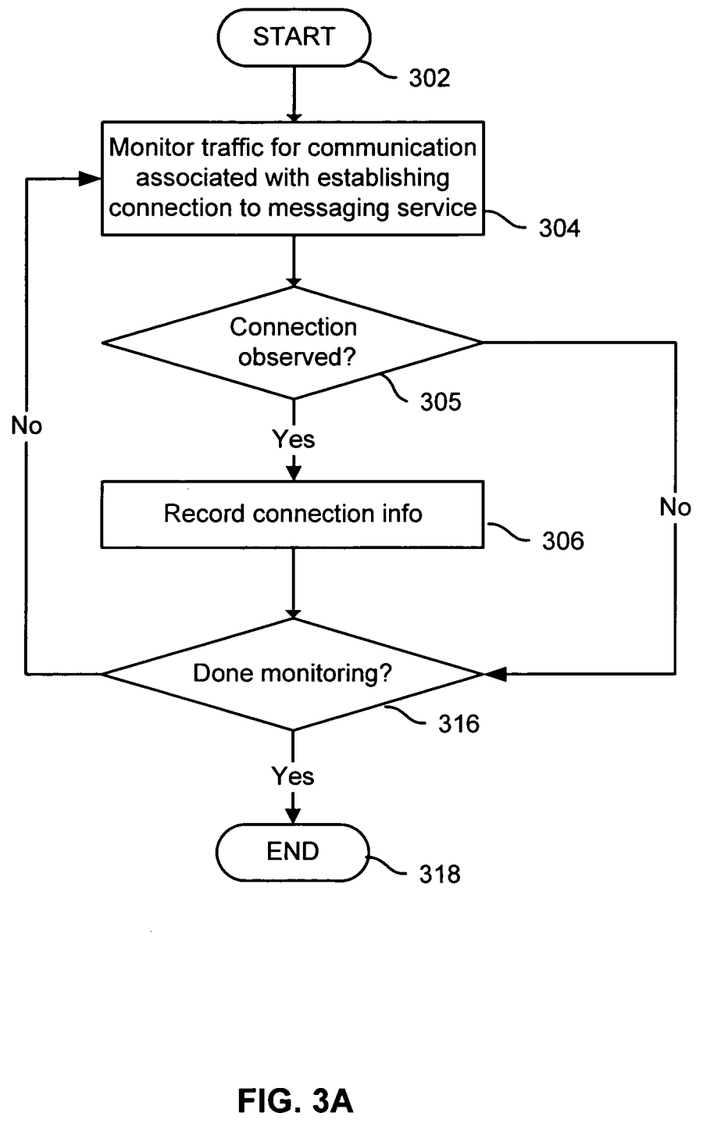
FIG. 3A is a flowchart illustrating an embodiment of a process for monitoring network activity for messaging service contact information.

FIG. 3A is a flowchart illustrating an embodiment of a process for monitoring network activity for messaging service contact information. This process may be performed by any network security system and/or application monitoring activity between a host and an external network. For example, the network security system may include firewall 206 and/or IPS 212. Installing a local agent on each host is not necessary.

In the example shown, the process begins at 302. At 304, network traffic is monitored for a communication associated with establishing a connection to a messaging service. An example of a communication associated with establishing a connection to a messaging service includes a set up message sent to a messaging server to establish a connection to a messaging service using a layer 4 protocol such as UDP or TCP. The messaging service may include, for example, IM, IRC, Voice over IP (VoIP), or any live/real time, or near real time communication service. Message(s) associated with establishing a connection to a message service may be detected by inspecting the header and/or content of the message. For example, the header may include "AIM 3.1," and the content may include text or a number/code associated with establishing a connection to a message service in AIM 3.1.

Figure 4:
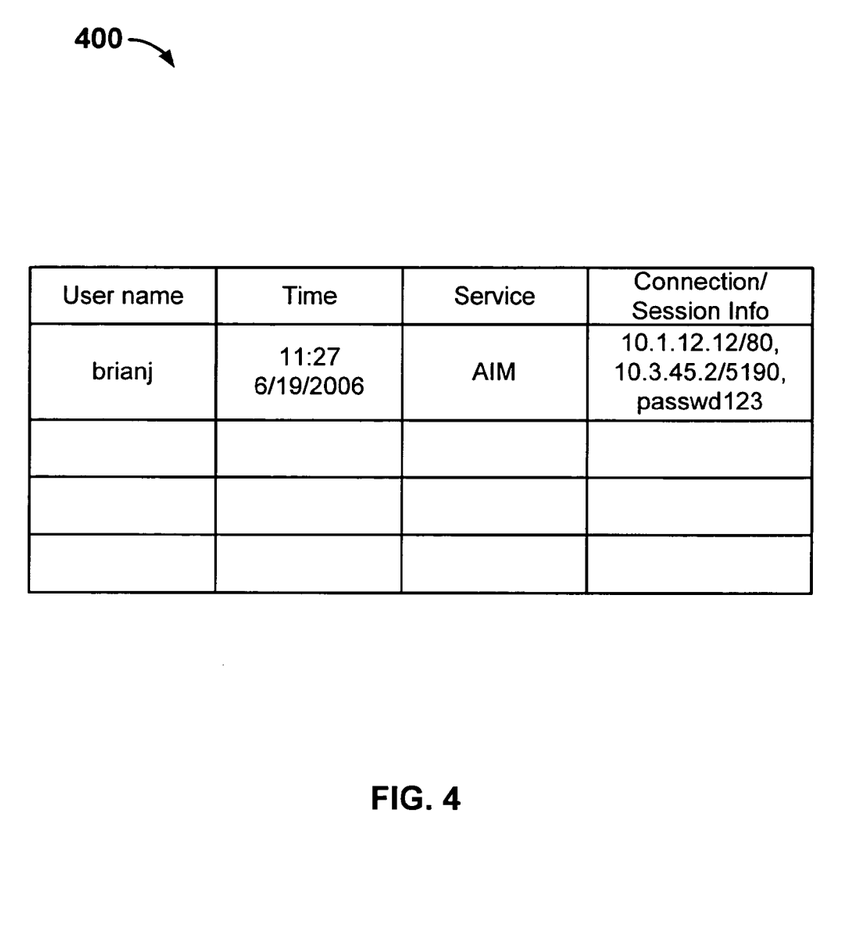
FIG. 4 is an example of a state table that may be used to store connection information.

If a communication associated with establishing a connection to a messaging service is observed (305), connection information is recorded at 306. By analyzing the header and/or content of the message, connection information such as username, service, source address, source port, destination address, and destination port, password, encryption keys and methods, protocol, and server, can be derived and recorded. The time of the request may also be recorded. The service may be indicated in the header, or derived by checking other information in the message, such as the format and/or content of the message body/payload. Certain IP addresses, ports, and/or servers are associated with certain messaging services, and in some embodiments such associations are used to identify and process communications associated with establishing a connection to a messaging service. For example, the default TCP port for YIM is 5050, the default TCP port for AIM is 5190, and IRC typically uses ports in the higher 6000 range, so if a source or destination port is 5190, it is likely that the service is AIM. If the hostname is also "oscar.aol.com" then it is even more likely that the service is AIM. In some embodiments, connection information is recorded in a state table, such as table 400, as more fully described below.

At 316, it is determined whether monitoring is done. For example, a system administrator may have disabled monitoring. If monitoring is done, the process ends at 318. If monitoring is not done, then the process returns to 304.

Figure 3B:
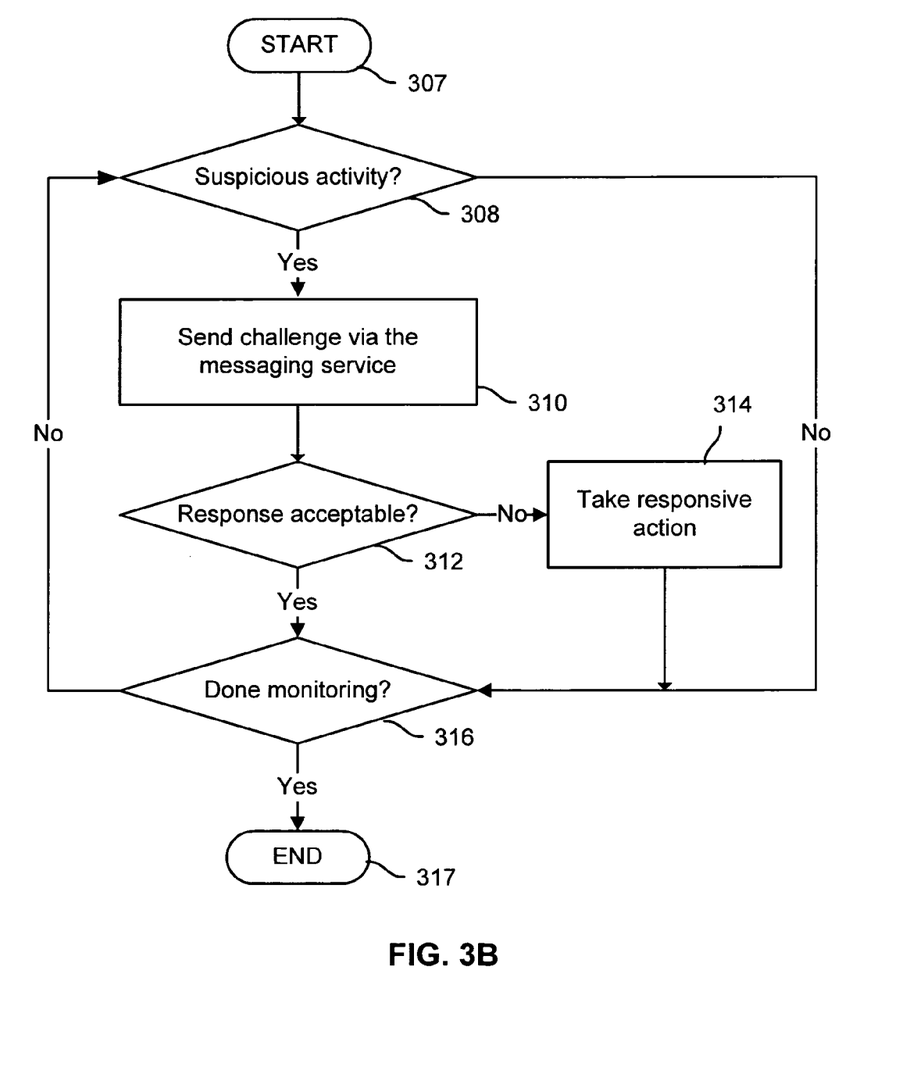
FIG. 3B is a flowchart illustrating an embodiment of a process for monitoring network activity.

FIG. 3B is a flowchart illustrating an embodiment of a process for monitoring network activity. This process may be performed by any network security system and/or application monitoring activity between a host and a messaging service. For example, the network security system may include firewall 206 or IPS 212. Installing a local agent on each host is not necessary, although the process of FIG. 3B could be implemented on the client/host.

In the example shown, the process begins at 307. At 308, it is determined whether suspicious activity is observed. The definition of and/or threshold for suspicious activity may be configurable. Examples of suspicious activity include: a message that appears to be originated by a program (e.g., a string of binary data) as opposed to a human user, a spike in traffic connecting to a particular chat room (either from a single hosts or from multiple hosts on a monitored network), multiple logins from the same IP address, multiple logins by the same username (or a set of variants, e.g., usernames having a common root) from different IP addresses, a high frequency of messages being exchanged, a large stream of small UDP packets, usernames that appear to be computer generated, or any activity that appears to deviate from normal behavior by a user or host. In a high security environment, suspicious activity may include any attempt to login to a messaging service. In some embodiments, an interface is provided to enable a network security administrator and/or other authorized user to specify a level of sensitivity and/or specific traffic and/or patterns that are to be considered suspicious.

In some embodiments, the suspicious activity is observed by monitoring a messaging service channel using information obtained from set up messages or messages associated with connecting to a group service sent by a monitored participant. For example, if the messaging system is AIM on server "oscar.aol.com," the chat room is "travel," and the password is "pword123," then an AIM account can be created and used to login to the server and join the chat room using the password or a derivative of the password (e.g., a key). In some embodiments, a preexisting account is established for each of one or more popular messaging services, such as AIM and YIM, and the preexisting account is used to join and log in to a chat room to which a participant has been observed to join and/or connect. In some embodiments, for each of one or more popular messaging services the account creation and/or login and/or channel or chat room joining protocols are known and/or learned by observing network traffic, and such knowledge is used to create dynamically, e.g., after a connection to a particular service has been observed, an account to be used by the security application and/or system to monitor and/or send communications via the service. The messaging service account created and/or accessed by the security application and/or system is used in some embodiments to monitor chat room messages. The messaging service account is used in some embodiments to send a challenge message, as described more fully below, to verify that the participant is a human user and not a bot.

Suspicious activity in various embodiments is determined heuristically and/or based on historical data. For example, if brianj logs into a messaging system and then brianj2 logs into a messaging system from the same host, and subsequently joins a chat room, this may be identified as suspicious activity. For example, a malicious agent on the host may have observed a legitimate login by brianj and then used that information, without the authorized user's knowledge or permission, to open a second account to be used for malicious purposes.

Suspicious activity may be unrelated to the messaging service, but related to a participant using the messaging service. For example, a sudden spike in traffic from an endpoint may be observed. An IP address associated with that endpoint is also associated with an AIM username. For example, an AIM participant has been known to login from the IP address. In another example, a worm is observed spreading in a network, and 30 minutes prior to the worm originating, a particular participant (e.g., username) logged into a messaging service.

If suspicious activity is not observed, then the process continues at 316, and it is determined whether monitoring is done. For example, a system administrator may have disabled monitoring. If monitoring is done, the process ends at 317. If monitoring is not done, then the process returns to 308 and monitoring continues.

If at 308, suspicious activity is observed, a challenge is sent via the messaging service at 310. The challenge in various embodiments includes a query or question sent to the messaging service participant that might be difficult to programmatically answer. An example of a challenge is a "captcha" (completely automated public Turing test to tell computers and humans apart), which is a type of challenge-response test used in computing to determine whether or not a recipient and/or responder is human. Examples of captchas include visual or image captchas (e.g., an image is shown and the participant is asked to identify something depicted in the image), linguistic captchas (e.g., limericks), musical captchas, etc. Besides captchas, various challenge-response tests may be used. For example, challenge-response techniques commonly used to block spam may be used. The challenge used may vary based on the configuration, service, the server, characteristics of the observed suspicious activity, etc. For example, a high security system may ask that the participant respond by telephoning a phone number and speaking to a live representative. A lower security system may allow the participant to respond using the messaging service.

The challenge can be sent to the participant via the messaging service using the information obtained when the participant first requested login, e.g., at 304. Because the information was recorded at 306, that information can be accessed to determine to whom to send the challenge. For example, if the participant is "brianj," the messaging system is AIM, and the server is "oscar.aol.com," then an an admininstrative AIM account can be used to login to server "oscar.aol.com" and send an instant message to participant "brianj". The message might say "Message from security-admin: To continue, please identify the word in this image" followed by an image captcha or it might provide more information: "Message from security-admin: brianj, your account has recently sent 10 binary messages. Did you mean to send these messages? If so, please identify the word in this image. If not, please contact your system administrator as there may be a security issue with your computer." A series of interactive messages may be exchanged between the administrator and the participant. For example, if in the above example, participant brianj indicates in his response that he did not mean to send those messages, the administrator may then ask whether he has recently installed software, and from where he obtained the software.

In some embodiments, the participant is privately messaged and the challenge is only sent to or viewable by the participant. In some embodiments, the challenge is sent to or viewable by multiple participants.

At 312, it is determined whether a response is acceptable. In response to the challenge sent at 310, the participant responds. If the participant is a bot or other malicious program, the program should not be able to respond correctly, if at all, to the challenge. If the participant is human, then the participant should be able to respond correctly the challenge.

In a high security environment, the challenge might be sent as soon as a participant attempts to connect to a messaging service. In some embodiments, the join message is not forwarded to the messaging server until the participant responds correctly to the challenge.

If the response is acceptable, then the process continues at 316, and it is determined whether monitoring is done. If the monitoring is done, the process ends at 317. If the monitoring is not done, the process continues at 308 and monitoring continues.

If at 312, the response is not acceptable, then responsive action is taken at 314. In some embodiments, the system may be configured to perform a different responsive action depending on the nature of the suspicious activity and/or the response. Examples of responsive action include: blocking traffic associated with the connection, participant, and/or host; blocking traffic associated with the group service (e.g., channel or chat room); blocking all traffic associated with the messaging system; sending an alert; and logging the event. For example, if the suspicious activity comprises messages that have a high probability of being associated with an attack, then communication to/from that group service can be blocked. If the suspicious activity comprises messages that have a lower probability of being associated with an attack, then that participant may be flagged or some other indication of this event is recorded for that participant in a state table or elsewhere.

Examples of responsive action include performing remediation (e.g., finding and removing the bot or malicious program from) on the host associated with the suspicious action. For example, a message is sent to the participant indicating that the participant's computer may have been compromised and suggesting that he/she run some kind of remediation software on the affected computer. In some embodiments, the remediation software automatically runs. In some embodiments, the participant is prompted prior to running remediation software. The remediation software suggested/used may depend on the type of suspicious activity, the challenge, and the response.

There may be cases in which a legitimate participant does not respond correctly. For example, the user is away from his desk at the time and does not respond. The system may be configured to handle such cases in various ways, e.g., using thresholds, previous history, and/or local policy. For example, in some embodiments if a more secure configuration is desired, e.g., as indicated by an administrator via an interface, the participant is blocked from further communication, and a message such as the following is sent to the participant: "Message from security-admin: You have not responded within the time out period. Your messages will all be blocked. Please contact your system administrator." In some embodiments, the system is or may be configured to log out the participant. To log out the participant, in some embodiments a spoofed logout message is sent to the messaging server using the connection information recorded at 306. If a less secure configuration is desired, the participant is marked as potentially suspicious and monitoring of the participant's activity continues. Such information may be recorded in a table, for example.

In some embodiments, the response to a challenge is sent using an out of band communication. In other words, the challenge is sent using the messaging service, and the response is sent using another type of communication. For example, the challenge may direct the participant to respond by going to a website or IP address in a browser, calling a phone number, over an analog phone line or over a VoIP connection, etc.

Botnets are not necessarily malicious. There may be cases in which bots are purposely installed on a system by a system administrator for network health monitoring, etc. In some embodiments, exceptions are written into the challenge response query such that friendly bots give responses that are acceptable. In some embodiments, known non-malicious bots and/or similar agents are "white listed", so that communications known and/or determined to have been originated by such a non-malicious bot are not determined to be suspicious, even if they satisfy detection criteria.

FIG. 4 is an example of a state table that may be used to store connection information. For example, connection information may be recorded in table 400 in response to observing communication associated with establishing a connection to a messaging service. State table 400 is shown to include columns for username, time stamp, service, and connection/session information. Username is the screen name or login name used by a participant of a messaging service. Time stamp in some embodiments indicates the time when the participant sent the request to establish the connection. The service indicates the name of the messaging service (e.g., YIM, AIM, IRC, VoIP). Connection and session information in various embodiments includes information such as the source address, source port, destination address, destination port, a password, a server, a channel/chat room identifier, etc. The data in table 400 may be obtained from one or more messages. For example, in the initial request, a message may include the username, service, source address, source port, destination address, and destination port. The password may be sent in a later message, and recorded in table 400 at that point in time. Likewise, a participant may in one communication log in to a messaging service and in a subsequent message join (or become actively connected to) a channel or chat room. In the example shown in FIG. 4, the username is "brianj," the time is "11:27 6/19/2006," the service is AIM, the source IP address is 10.1.12.12, the source port is 80, the destination address is 10.3.45.2, the destination port is 5190, and the password is "passwd123". The destination port 5190 is associated with AIM.

In some embodiments, the state table is updated when other types of messages are observed. For example, when a participant connects to a group service (e.g., an IM chat room), information (e.g., chatroom identifier or name) may be gleaned from associated connection messages and stored in the state table. In another example, the time stamp column may be updated each time there is a message sent from the participant, so that the time stamp gives an indication of how live the connection is. If there has been no activity for over an hour, for example, the system may logout the participant. Time out values and actions may be controlled by the messaging service, and may vary depending on the service and/or server.

In addition, columns indicating historical information, such as whether a participant has responded in the past successfully to a challenge (and whether that was during a current or previous session), which IP addresses a participant has logged in from in the past, etc. may be stored in table 400.

In some embodiments, the state table is analyzed periodically to determine whether suspicious activity has occurred. For example, if a participant sends messages associated with a low probability that they are associated with an attack, then the participant might be marked as suspicious in table 400 and/or the event might be logged in table 400. If this occurs multiple times or in combination with other suspicious activity, then that participant may be challenged. The participant may already have been challenged, in which case the participant may be blocked or challenged again.

The information in table 400 may be stored in one or more tables, in a database, in a file, or in any other appropriate way. For example, as data in table 400 is updated, previous or overwritten data may be stored in a log file, which can be used for analysis.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of monitoring activity in a network, the method comprising:
   monitoring a communication associated with a messaging service, wherein the monitoring includes monitoring for connection information associated with a user account associated with a host computing device via the monitored communication, the connection information permitting at least one of a security application and a security system associated with a separate account to perform a separate login to the messaging service using the connection information from the monitored communication, the separate account being different from the user account, the separate account and the user account both being logged in to the messaging server, the user account being logged in to the messaging service from the host computing device, and the separate account being logged in to the messaging service from the security application, the security application residing within the host computing device or within a separate security device in communication with the host computing device over a network;

observing suspicious activity associated with the host computing device;

determining whether the observed suspicious activity exceeds a specified threshold; and sending a challenge to the host computing device using the messaging service in the event that the observed suspicious activity exceeds the specified threshold, wherein the challenge is based at least in part on the observed suspicious activity, and wherein a response from a user to the challenge via the host computing device determines whether the user using the host computing device is in control of the user account.

2. The method as recited in claim 1, further comprising storing in a state table connection information associated with the host, wherein the state table is stored on at least one of the host computing device, the security application, and the security system.

3. The method as recited in claim 1, wherein the messaging service includes one or more of the following: Internet Relay Chat (IRC); IRC channel; Instant Messaging (IM); IM chat room; and Voice over Internet Protocol (VoIP).

4. The method as recited in claim 1, wherein the suspicious activity is related to the messaging service.

5. The method as recited in claim 1, wherein the suspicious activity is unrelated to the messaging service.

6. The method as recited in claim 1, wherein the suspicious activity includes connecting to a group service.

7. The method as recited in claim 1, wherein the suspicious activity is associated with a botnet.

8. The method as recited in claim 1, wherein the challenge includes a captcha.

9. The method as recited in claim 1, wherein the challenge includes a question.

10. The method as recited in claim 1, wherein the monitoring includes obtaining connection information associated with the host computing device and the challenge is sent using the connection information.

11. The method as recited in claim 1, further comprising receiving a response from the host computing device via an out of band communication.

12. The method as recited in claim 1, further comprising receiving a response from the host computing device and determining whether the response is acceptable.

13. The method as recited in claim 1, further comprising taking responsive action based at least in part on a determination that an acceptable response was not received from the host computing device.

14. The method as recited in claim 13, wherein the responsive action includes one or more of the following: blocking traffic from a participant using the messaging service; blocking traffic from a participant using a group service associated with the messaging service; blocking traffic from the host computing device; and adding information to a logfile.

15. The method as recited in claim 1, wherein monitoring a communication associated with a messaging service includes monitoring network communications between an internal host computing device associated with an internal network and an external host computing device associated with an external network and recognizing that a particular monitored communication is associated with the messaging service.

16. The method as recited in claim 1, wherein the particular monitored communication is recognized as being associated with the messaging service based at least in part on one or more of the following: message format; header format; header content; communication port; communication protocol; and message body content.

17. The method of claim 1, further comprising:

dynamically creating an account for a service of the host computing device using the connection information, the account to be used by the security application.

18. A system for monitoring activity in a network, the system comprising:

a processor configured to:

monitor a communication associated with a messaging service, wherein the monitoring includes monitoring for connection information associated with a user account associated with a host computing device via the monitored communication, the connection information permitting at least one of a security application and a security system associated with a separate account to perform a separate login to the messaging service using the connection information from the monitored communication, the separate account being different from the user account, the separate account and the user account both being logged in to the messaging service, the user account being logged in to the messaging service from the host computing device, and the separate account being logged in to the messaging service from the security application, the security application residing within the host computing device or within a separate security device in communication with the host computing device over a network;

observe suspicious activity associated with the host computing device;

determine whether the observed suspicious activity exceeds a specified threshold; and send a challenge to the host computing device using the messaging service in the event that the observed suspicious activity exceeds the specified threshold, wherein the challenge is based at least in part on the observed suspicious activity, and wherein a response from a user to the challenge via the host computing device determines whether the user using the host computing device is in control of the user account; and a memory coupled with the processor, wherein the memory provides the processor with instructions.

19. A non-transitory computer readable storage medium for monitoring activity in a network, the non-transitory computer readable storage medium comprising computer instructions for:

monitoring a communication associated with a messaging service, wherein the monitoring includes monitoring for connection information associated with a user account associated with a host computing device via the monitored communication, the connection information permitting at least one of a security application and a security system associated with a separate account to perform a separate login to the messaging service using the connection information from the monitored communication, the separate account being different from the user account, the separate account and the user account both being logged in to the messaging service, the user account being logged in to the messaging service from the host computing device, and the separate account being logged in to the messaging service from the security application, the security application residing within the host computing device or within a separate security device in communication with the host computing device over a network;

observing suspicious activity associated with the host computing device;

determining whether the observed suspicious activity exceeds a specified threshold; and sending a challenge to the host computing device using the messaging service in the event that the observed suspicious activity exceeds the specified threshold, wherein the challenge is based at least in part on the observed suspicious activity, and wherein a response from a user to the challenge determines whether the user using the host computing device is in control of the user account.

\* \* \* \* \*